(12) United States Patent
Colombo et al.

(10) Patent No.: US 7,805,250 B2
(45) Date of Patent: Sep. 28, 2010

(54) METHODS AND APPARATUS FOR GEOPHYSICAL EXPLORATION VIA JOINT INVERSION

(75) Inventors: Daniele Colombo, Calgary (CA); Michele De Stefano, Soncino (IT)

(73) Assignee: WesternGeco L.L.C., Houston, TX (US)

( * ) Notice: Subject to any disclaimer, the term of this patent is extended or adjusted under 35 U.S.C. 154(b) by 642 days.

(21) Appl. No.: 11/829,551

(22) Filed: Jul. 27, 2007

(65) Prior Publication Data
US 2008/0059075 A1 Mar. 6, 2008

Related U.S. Application Data

(63) Continuation-in-part of application No. PCT/IT2006/000636, filed on Sep. 4, 2006.

(51) Int. Cl.
*G01V 11/00* (2006.01)
(52) U.S. Cl. ............... 702/14; 702/17; 702/18; 367/73
(58) Field of Classification Search ........ 702/14, 702/17, 18; 367/73
See application file for complete search history.

(56) References Cited

U.S. PATENT DOCUMENTS

| 5,671,136 A * | 9/1997 | Willhoit, Jr. ............ 702/18 |
| 2003/0021184 A1 | 1/2003 | Zhang |
| 2010/0014384 A1 | 1/2010 | Colombo |

OTHER PUBLICATIONS

European Patent Office, EP 08161220.2 Examination Report dated Jul. 31, 2009 (3 pages).
European Patent Office ISA, PCT/IT2006/000636 Search Report dated Nov. 27, 2007 (12 pages).

Colombo et al., Geophysical modeling via simultaneous joint inversion of seismic, gravity, and electromagentic data: Application to prestack depth imaging, XP-001504879—Mar. 2007 (6 pages).
Heincke et al., Joint Inversion of MT, Gravity and Seismic Data applied to sub-basalt Imaging, SEG/New Orleans 2006 Annual Meeting, XP-002505016, pp. 784-789.
Aversana, Integration of seismic, MT and gravity data in a thrust belt interpretation, First Break, vol. 19, Jun. 2001, XP-002457952, pp. 335-341.
Gallardo et al., Joint two-dimensional DC resistivity and seismic travel time inversion with cross-gradients constraints, Journal of Geophysical Research American Geophys. Union, USA, vol. 109, No. B3, Mar. 10, 2004 (11 pages).

(Continued)

*Primary Examiner*—Drew A Dunn
*Assistant Examiner*—Hien X Vo

(57) ABSTRACT

Methods and apparatus are provided for generating velocity models for pre-stack depth migration ("PSDM"). Seismic, gravity and electromagnetic joint inversion input data are generated based on observed seismic, gravity and electromagnetic data (e.g., magnetotelluric and/or controlled source electromagnetic), and velocity, density and resistivity models. A joint inversion is performed to produce a multiparametric model that is a function of velocity, density and resistivity parameter distributions. The separate parameter distributions are extracted from the multiparametric model, and the extracted velocity model is used to perform a PSDM. A migration velocity analysis is performed on PSDM output to generate seismic image residuals. If the seismic image residuals meet predetermined quality objectives, the extracted velocity model is output as the final velocity model for PSDM. Otherwise, updated seismic, gravity and electromagnetic joint inversion input data are generated, and the process repeats in an iterative fashion until the seismic image residuals meet the predetermined quality objectives.

44 Claims, 15 Drawing Sheets

OTHER PUBLICATIONS

Hovertsten et al., Direct reservoir parameter estimation using joint inversion of marine seismic AVA and CSEM data, Geophysics Society Exploration Geophysicists USA, vol. 71, No. 3, May 2006, pp. C1-C13.

Kowalsky et al., Joint inversion of geophysical and hydrological data for improved subsurface characterization, Leading Edge Soc. Exploration Geophysicists USA, vol. 25, No. 6, Jun. 2006, pp. 730-734.

* cited by examiner

METHODS AND APPARATUS FOR GEOPHYSICAL EXPLORATION VIA JOINT INVERSION

REFERENCE TO RELATED APPLICATION

This application is a continuation-in-part of International Patent Application Serial No. PCT/IT2006/000636, with an international filing date of 7 Sep. 2006, which is incorporated by reference herein in its entirety.

BACKGROUND

This invention pertains to methods and apparatus for geophysical exploration. In particular, this invention pertains to methods and apparatus for creating velocity models for Pre-Stack Depth Migration ("PSDM") via joint inversion ("JI") of seismic, gravity (where gravity may include any type of scalar and/or vectorial gravity measurements and derived quantities such as: gravity field measurements, gradient measurements, Bouguer anomaly, etc.), and electromagnetic data (e.g., magnetotelluric ("MT") and/or controlled-source electromagnetic ("CSEM"), where Controlled-Source Electromagnetic may include any geophysical exploration method based on electromagnetic induction in the earth, measured and/or computed in frequency or time domains).

Effective depth imaging through migration requires a reliable estimate of the seismic velocity model (i.e., an area or volumetric description of the speed of seismic waves like the compressional body wave velocity, commonly known as the P-wave velocity). Indeed, an incorrect seismic velocity model can cause severe lateral and vertical mispositioning of reflectors in depth other than avoiding the reconstruction of existing reflecting horizons. This problem severely impacts the exploration of hydrocarbons by increasing the risk of drilling dry wells or by misidentifying oil and gas-bearing structures.

The task of deriving a reliable P-wave velocity model is non-trivial, especially if the seismic data has poor Signal-to-Noise ratio, if there is little available a-priori information about subsurface seismic velocities, and if the subsurface geology has a complex laterally-varying structure. Problematic seismic imaging conditions are typically encountered in thrust-belt hydrocarbon prospects, but also for sub-basalt and sub-salt prospects (both land and marine). In such cases, the integration of multiple geophysical parameters can successfully reconstruct the seismic velocity distribution in depth with higher degrees of reliability than using the seismic method alone, thus reducing the exploration risks.

The derivation of a reliable velocity model can be performed through various approaches, including "model-driven" and "data-driven" methods. Model-driven methods transform a geological section directly into a velocity model to be used for PSDM. The convergence of the initial velocity estimate to the final velocity model is obtained in a trial-and-error approach consisting of manually changing the distribution of velocity in the model, performing a new PSDM and controlling the post-migration image gathers together with the geologic reliability. These methods may not always provide seismic velocity models that agree with the measured geophysical data (i.e., arrival times of seismic waves, observed gravity anomalies or calculated resistivity functions from electromagnetic measurements), and explore only a limited sub-group of models.

Data-driven methods, following a more rigorous approach (e.g., minimization of a cost function), always yield a model that fits the measured data, but the final velocity structure may not agree with geological considerations. Systematic and random errors in the input inversion data, non-uniqueness of the solution and sensitivity of the data to the model parameters (e.g., first-break tomography is more sensitive to high-velocity zones than to low-velocity ones, electromagnetic methods are more sensitive to conductive zones than to resistive ones) provide in many cases a difficult solution of the problem.

The integration of different sources of information (geophysical data, including seismic and non-seismic, a-priori information and interpretational constraints) reduces the non-uniqueness of the solution and provides improved seismic resolution in complex geology conditions. Previously known data integration techniques have been developed by deriving a model in one of the domains (generally seismic), transforming the data via empirical functions into another geophysical domain (e.g., density or resistivity) and then performing modeling or inversions in the corresponding non-seismic domain. In some cases, the resulting models could be transformed back into the seismic velocity domain to be used to improve the seismic imaging results.

Although such previously known data integration techniques are valuable in theory, they have several problems in practice. A primary problem consists of defining reliable functions relating seismic velocity to density or resistivity for transforming parameters between different geophysical domains. Another problem is that, although the target is the integration of data, the actual implementation of the described workflow gives greater weight to the seismic-derived model than the non-seismic methods. Thus, the non-seismic methods are confined to work around an initial seismic model, with little chance of substantially modifying it (especially in a linearized inversion approach). This inexact formulation of the integration problem is the main reason why the integration of different-nature geophysical data has been so far a matter of "art" related to the ability and experience of the geophysicists or interpreter, rather than related to any analytical and quantitative approaches.

It would be desirable to provide improved methods and apparatus for generating seismic imaging velocity models by integrating seismic, gravity, and electromagnetic (e.g., MT and/or CSEM) data.

SUMMARY

Methods and apparatus in accordance with this invention perform joint inversion to create velocity models for PSDM. In particular, methods and apparatus in accordance with this invention perform joint inversion using seismic travel-time residuals, gravity data, electromagnetic (e.g., MT and/or CSEM) data, external constraints and geological interpretation to solve a multi-parameter geophysical model. The seismic compressional body wave velocity (i.e., P-velocity) portion of the multiparametric geophysical model obtains benefits from the other geophysical methods without loss of resolution. The improved P-velocity depth-domain reconstructed velocity model may then be used to obtain a more reliable PSDM image of the subsurface with a reduced number of iterations and with greater reliability compared to conventional velocity model building approaches. As a result, the resolution of the seismic images of the subsurface may be improved, thus improving the geological interpretation of structures, and ultimately reducing the exploration risks.

Within the framework of a depth imaging project (i.e., PSDM), the joint inversion can take place at various levels during velocity model building using both pre-migration seismic wave travel-time residuals (e.g., seismic first-arrival travel times in the form of first-breaks) and post-migration residual-curvature depth-to-time converted residuals (obtained from the analysis of post-migrated image gathers). The non-seismic portion of the joint-inversion input data may include gravity residuals (e.g. Bouguer anomaly data, gravity field gradient residuals) and MT soundings (in the form of apparent resistivity and phase versus frequency or period) and/or CSEM data (in the form of apparent resistivity and phase versus frequency or period for frequency-domain computations, or electric field time decay residuals and/or derivatives of these quantities for time domain measurements).

The advantage of performing a joint inversion with multiple parameters at the initial stages of the velocity model building process is that of deriving a robust velocity model from surface to depth which is able to provide a reliable migration beginning with the very first iteration steps. This characteristic is considered an advantage in relation to successive steps in which a migration velocity analysis is performed and the residual curvature of post-migrated image gathers is evaluated.

The external constraints that can be applied for the joint inversion consist of the knowledge of geophysical parameter distributions within the model (e.g., from well logs) and the interpretative knowledge about the patterns and shapes of geologic bodies (i.e., geologic interpretation). The dimensionality of the problem may be two-dimensional or three-dimensional, and the methods for solving the joint inversion problem may be linear or nonlinear.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

Figure 1:
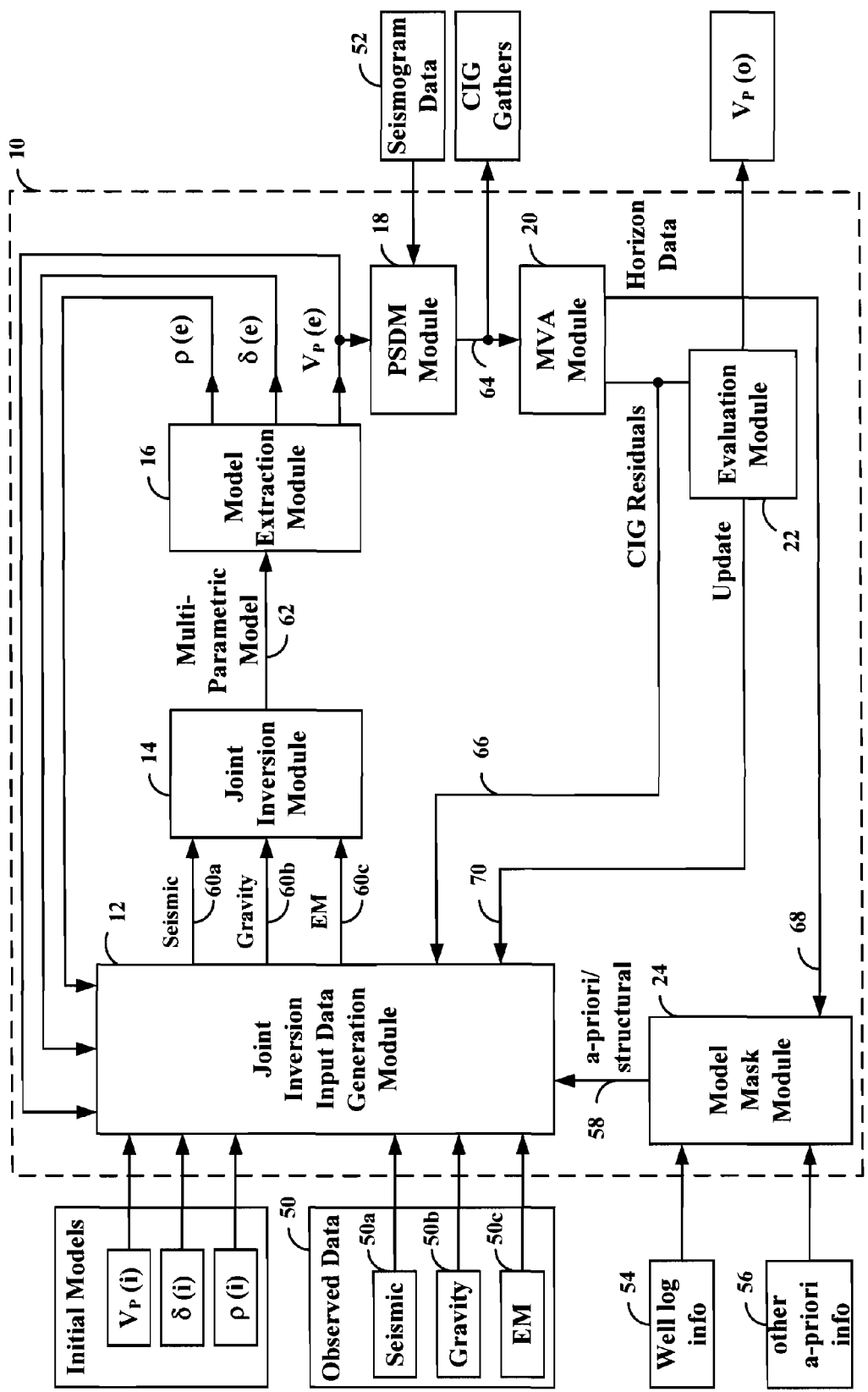
FIG. 1 is a block diagram of an exemplary joint inversion system in accordance with this invention.

Apparatus and methods in accordance with this invention implement an iterative process to generate velocity models that may be used for PSDM. In each iteration, seismic, gravity and electromagnetic input data are generated for use in a joint inversion (referred to herein as "joint inversion input data"). In the first iteration, initial joint inversion input data are calculated based on observed seismic, gravity and electromagnetic data, and initial velocity, density and/or resistivity models. The initial velocity, density and resistivity models may be, for example, user-supplied estimates of velocity, density and resistivity models, respectively.

Next, a joint inversion is performed on the initial joint inversion input data to produce a multiparametric model that is a function of velocity, density and resistivity parameter distributions. In particular, the multiparametric model represents the distribution of cross-correlated seismic P-velocity ($V_P$), density ($\delta$) and resistivity ($\rho$). The separate parameter distributions are extracted from the multiparametric model to form extracted velocity, density and resistivity models. The extracted velocity model is used to perform a PSDM, which generates a seismic image in depth in the form of post-migrated image gathers (referred to herein as "CIG gathers").

A migration velocity analysis is performed on the CIG gathers to evaluate the residual curvature of the CIG gathers to generate seismic image depth-domain residuals. The depth-domain residuals are then converted to time-domain residuals (referred to herein as "CIG residuals"). The CIG residuals are analyzed to determine if predetermined quality objectives are satisfied (e.g., if the CIG residuals are below a predetermined threshold). If the quality objectives are satisfied, the extracted velocity model is output as the final velocity model for PSDM, and the process terminates.

If, however, the CIG residuals do not meet predetermined quality objectives, updated seismic, gravity and electromagnetic joint inversion input data are generated. In particular, the updated joint inversion input data are calculated based on the observed seismic, gravity and electromagnetic data, and the extracted velocity, density and resistivity models from the previous joint inversion. The updated seismic joint inversion input data also may be calculated using the CIG residuals from the previous migration velocity analysis.

A joint inversion is performed on the updated joint inversion input data to produce an updated multiparametric model that is a function of velocity, density and resistivity parameter distributions. The separate parameter distributions are extracted from the updated multiparametric model to form updated extracted velocity, density and resistivity models. The updated extracted velocity model is used to perform a PSDM, which generates updated CIG gathers.

A migration velocity analysis is performed on the updated CIG gathers to generate updated CIG residuals. The updated CIG residuals are analyzed to determine if the predetermined quality objectives are satisfied. If so, the updated extracted velocity model is output as the final velocity model for PSDM, and the process terminates. If, however, the updated CIG residuals do not meet the predetermined quality objectives, the process repeats by calculating updated seismic, gravity and electromagnetic joint inversion input data, jointly inverting the updated joint inversion input data to generate another updated multiparametric model, and so on, until quality objectives are satisfied. Persons of ordinary skill in the art will understand that this iterative process may continue indefinitely, or may terminate after a predetermined number of iterations have been performed, or upon a user instruction to terminate.

Referring now to FIG. 1, an exemplary system in accordance with this invention is now described. Exemplary system 10 receives observed data 50, seismogram data 52, well log information 54, other a-priori information 56, and initial velocity, density and resistivity models $V_P(i)$, $\delta(i)$ and $\rho(i)$, respectively, and generates CIG gathers 64 and output velocity model $V_P(o)$. Observed data 50 may include seismic data 50a, gravity data 50b and EM data 50c that may be measured at one or more geographical areas, such as on-shore or off-shore, and at, below or above the Earth's surface (e.g. including airborne measurements). Seismic data 50a may include first arrival times (referred to herein as "First Breaks," or "FB"). Gravity data 50b may include any type of gravity field and gravity field gradients measurements, such as Bouguer anomaly data. EM data 50c may include MT data and/or CSEM data.

Seismogram data 52 may include a record of seismic waveforms as a function of time, of which seismic data 50a may be a subset. Well log information 54 may include data generated from sample well logs taken in or near the geographical area in which the observed data 50 were collected. Other a-priori information 56 may include any a-priori information that may help a user select homogeneous regions of the velocity, density and resistivity models. For example, other a-priori information may include geophysical measurements or geophysical knowledge about the velocity, density and resistivity models that may suggest subdivisions (or grouping) of the model units.

Exemplary system 10 includes joint inversion input data generation module 12, joint inversion module 14, model extraction module 16, PSDM module 18, migration velocity analysis ("MVA") module 20, evaluation module 22 and model mask module 24. As described in more detail below, joint inversion input data generation module 12 calculates joint inversion input data 60, which may include seismic joint inversion input data 60a, gravity joint inversion input data 60b and EM joint inversion input data 60c. Under the control of update control signal 70, joint inversion input data generation module 12 calculates joint inversion input data 60 based either on the initial velocity, density and resistivity models, $V_P(i)$, $\delta(i)$ and $\rho(i)$, respectively, or the extracted velocity, density and resistivity models, $V_P(e)$, $\delta(e)$ and $\rho(e)$, respectively.

For example, for the first iteration, update control signal 70 instructs joint inversion input data generation module 12 to calculate joint inversion input data 60 based on initial models $V_P(i)$, $\delta(i)$ and $\rho(i)$. Joint inversion module 14 receives the joint inversion input data 60 and generates a multi-parametric model 62. Model extraction module 16 extracts velocity, density and resistivity models $V_P(e)$, $\delta(e)$ and $\rho(e)$, respectively, from multi-parametric model 62. PSDM module 18 uses the extracted velocity model $V_P(e)$ to generate CIG gathers 64, and MVA module 20 calculates CIG residuals 66 and horizon data 68 based on the CIG gathers 64.

Evaluation module 22 determines if the CIG residuals 66 meet predetermined quality objectives. If the predetermined quality objectives are satisfied, evaluation module 22 outputs the current extracted velocity model $V_P(e)$ as the output velocity model $V_P(o)$. Otherwise, evaluation module 22 generates an update control signal 70 that instructs joint inversion input data generation module 12 to calculate updated joint inversion input data 60 based on extracted models $V_P(e)$, $\delta(e)$ and $\rho(e)$. As described in more detail below, throughout the joint inversion process, model mask module 24 may be used to specify joint inversion constraints.

Figure 2:
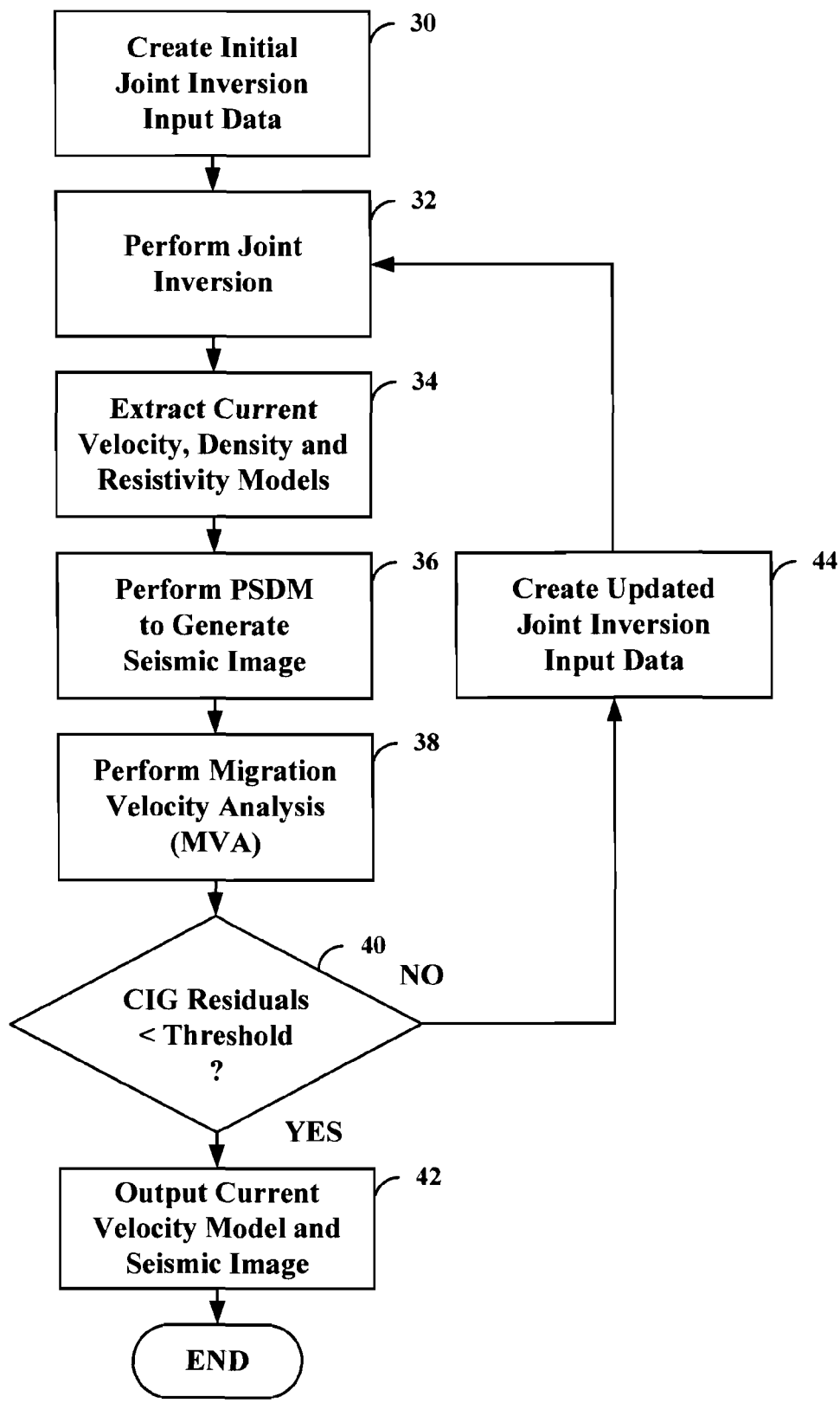
FIG. 2 is a flow diagram of an exemplary joint inversion process in accordance with this invention.

Referring now to FIGS. 1 and 2, an exemplary method performed by system 10 is described. Beginning at step 30, update control signal 70 instructs joint inversion input data generation module 12 to create the initial joint inversion input data 60. In particular, joint inversion input data generation module 12 receives initial velocity model $V_P(i)$, initial density model $\delta(i)$, initial resistivity model $\rho(i)$, observed data 50, and a-priori/structural information 58, and generates initial seismic joint inversion input data 60a, gravity joint inversion input data 60b and EM joint inversion input data 60c. At step 32, joint inversion module 14 receives the seismic joint inversion input data 60a, gravity joint inversion input data 60b and EM joint inversion input data 60c, and performs a joint inversion to generate a multiparametric model 62.

Next, at step 34, model extraction module 16 extracts velocity model $V_P(e)$, density model $\delta(e)$ and resistivity model $\rho(e)$ from the multiparametric model 62. At step 36, PSDM module 18 receives the extracted velocity model $V_P(e)$ and seismogram data 52, and generates CIG gathers 64. Next, at step 38, MVA module 20 receives CIG gathers 64, and performs a migration velocity analysis to generate CIG residuals 66 and horizon data 68. At step 40, evaluation module 22 determines if CIG residuals 66 meet predetermined quality objectives. For example, evaluation module 22 may determine if CIG residuals 66 are below a predetermined threshold. If so, at step 42, evaluation module 22 outputs the extracted velocity model $V_P(e)$ as the output velocity model $V_P(o)$. In addition, PSDM module 18 also may output the current CIG gathers 64, which represent an "optimal" seismic image.

If, however, CIG residuals 66 do not meet the predetermined quality objectives, at step 44, evaluation module 22 generates an update control signal 70 that instructs joint inversion input data generation module 12 to generate updated seismic joint inversion input data 60a, gravity joint inversion input data 60b and EM joint inversion input data 60c based on the extracted models $V_P(e)$, $\delta(e)$ and $\rho(e)$, observed data 50, a-priori/structural information 58, and optionally CIG residuals 66. The process then returns to step 32, wherein joint inversion module 14 receives the updated seismic joint inversion input data 60a, gravity joint inversion input data 60b and EM joint inversion input data 60c, and performs a joint inversion to generate an updated multiparametric model 62. This process continues in an iterative fashion until CIG residuals 66 satisfy the predetermined quality objectives, or until a predetermined number of iterations have been performed or a user terminates the operation of the system.

Although not illustrated in FIG. 2, during each iteration, model mask module 24 receives well log information 54, other a-priori information 56 and horizon data 68 (if available), and generates a-priori/structural information 58 that is provided to joint inversion input data generation module 12. A-priori/structural information 58 constitutes a "constraints inversion mask" that may be used to constrain portions of one or more of the velocity, density and resistivity models during the joint inversion.

For example, the constraints inversion mask may specify portions of a model in which geophysical parameters are already known (e.g., from well logs), and that should not be included in the unknown parameters to be inverted. Where external information such as geologic interpretation is used, the constraints inversion mask may be used to delimit portions of a model to be inverted from portions of a model where the user wants to maintain the results of previous iterations (e.g., a layer-stripping approach). In addition, using geological interpretation, the model mask may be used to indicate sub-portions of a model where uniformity of parameters is expected during the inversion (e.g., by setting the cross-correlation coefficients of model parameters in a model covariance matrix).

The constraints may be specified and applied independently, and the constraints inversion mask may include a single mask, or may include multiple masks. That is, a first set of constraints may apply to the seismic portion of the joint inversion, a second set of constraints may apply to the gravity portion of the joint inversion, and a third set of constraints may apply to the resistivity portion of the joint inversion, and the first, second and third sets of constraints may be independent of one another. Thus, the seismic portion of the joint inversion problem may include constraints that differ from constraints in the gravity portion of the joint inversion problem, and that differ from constraints in the EM portion of the joint inversion problem vice-versa.

Figure 3:
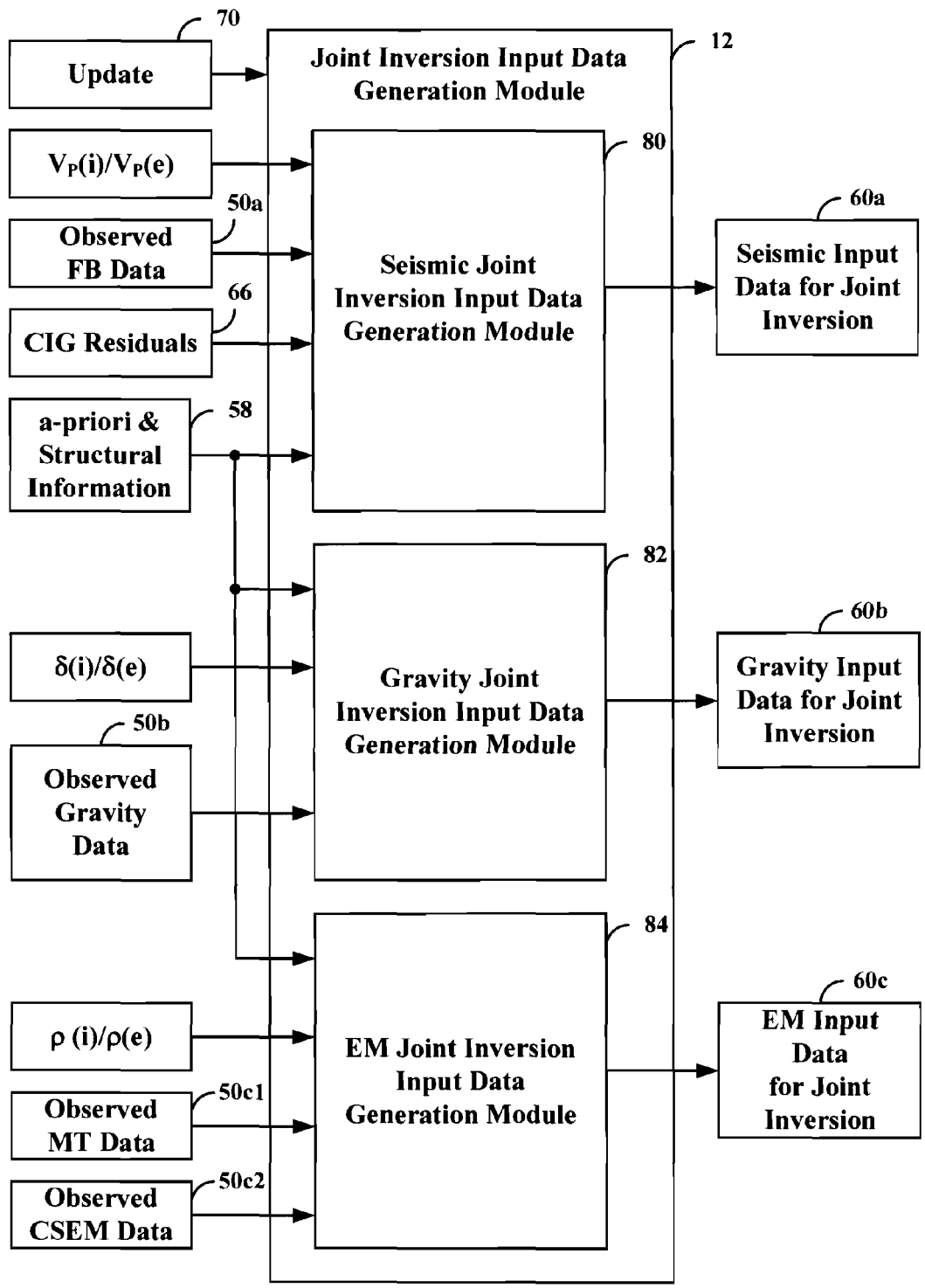
FIG. 3 is a block diagram of an exemplary joint inversion input data generation module in accordance with this invention.

As described above, joint inversion input data generation module 12 calculates seismic joint inversion input data 60a, gravity joint inversion input data 60b and EM joint inversion input data 60c used by joint inversion module 14. Referring now to FIG. 3, an exemplary joint inversion input data generation module 12 is described. In particular, joint inversion input data generation module 12 includes seismic joint inversion input data generation module 80, gravity joint inversion input data generation module 82, and electromagnetic joint inversion input data generation module 84. Each of these modules will be described in turn.

Figure 4:
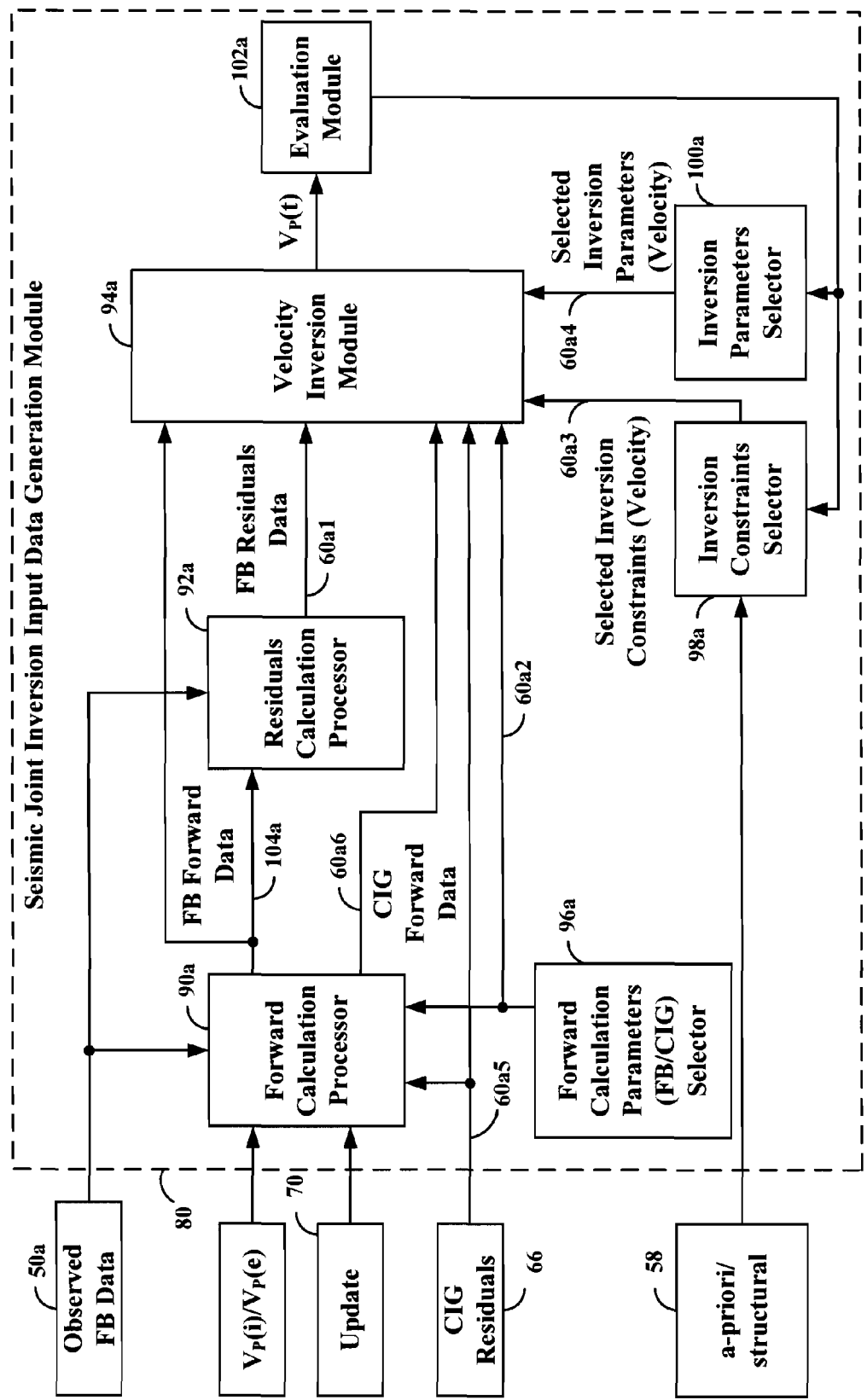
FIG. 4 is a block diagram of an exemplary seismic joint inversion input data generation module in accordance with this invention.

FIG. 4 illustrates an exemplary seismic joint inversion input data generation module 80, which includes forward calculation processor 90a, residuals calculation processor 92a, velocity inversion module 94a, forward calculation parameters selector 96a, inversion constraints selector 98a, inversion parameters selector 100a, and evaluation module 102a. As described in more detail below, seismic joint inversion input data generation module 80 receives observed FB data 50a and/or CIG residuals 66, velocity models $V_P(i)$ and/or $V_P(e)$, update control signal 70 and a-priori/structural information 58, and generates seismic joint inversion input data 60a. In this exemplary embodiment, seismic joint inversion input data 60a includes FB residuals data 60a1, velocity forward calculation parameters 60a2, selected velocity inversion constraints 60a3, selected velocity inversion parameters 60a4 and CIG residuals 60a5 (also labelled as CIG residuals 66).

Figure 5A:
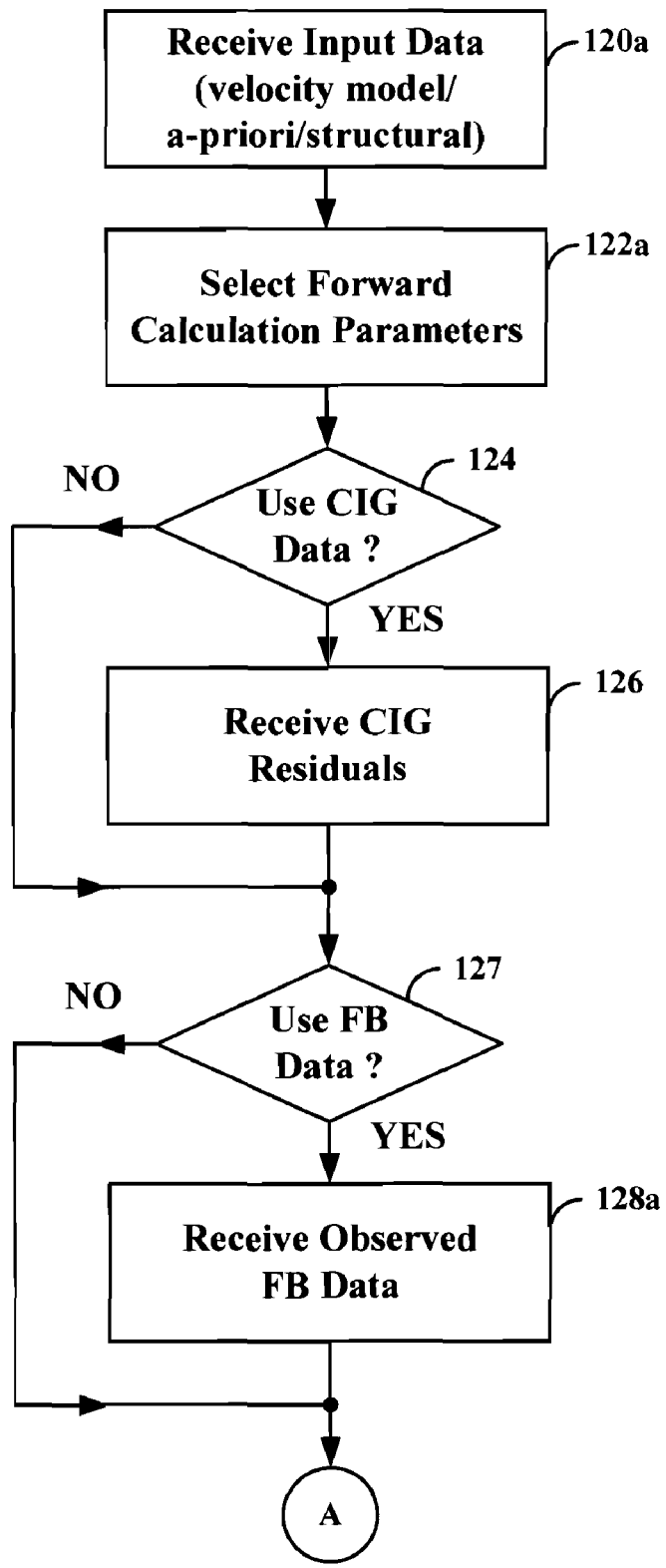
FIG. 5 is a flow diagram of an exemplary process for creating seismic joint inversion input data using the exemplary seismic joint inversion input data generation module of FIG. 4.
Figure 5B:
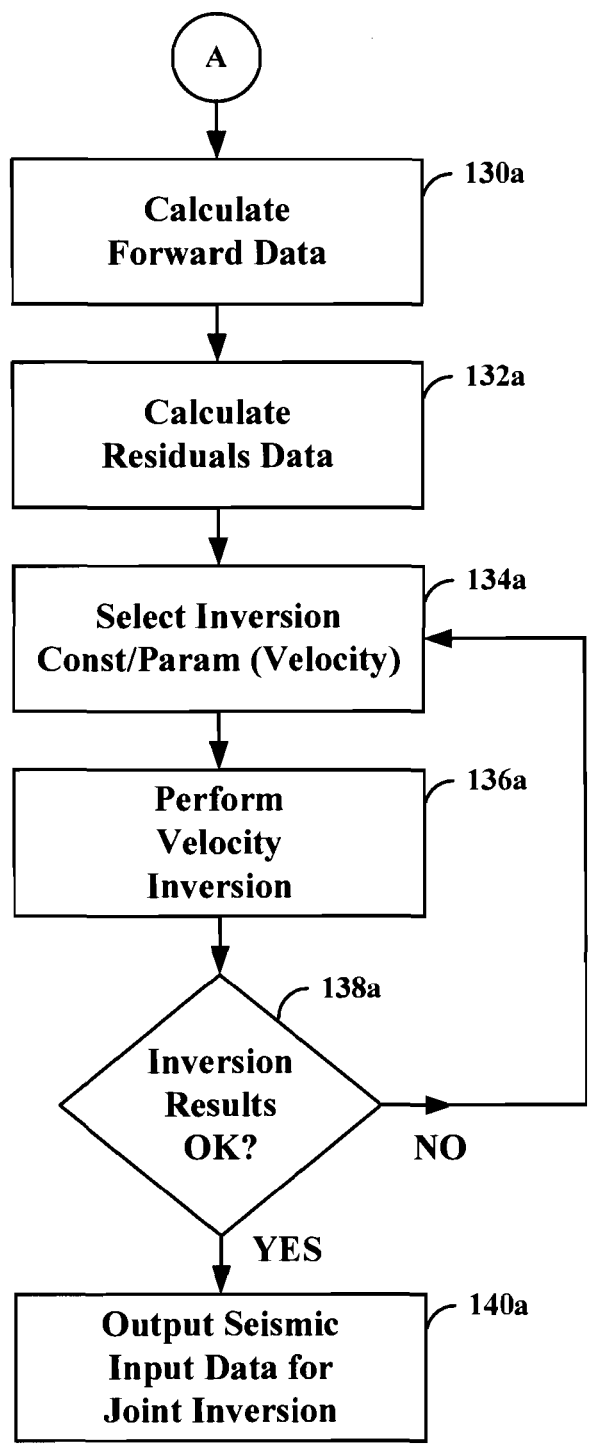

Referring now to FIGS. 4 and 5, an exemplary process implemented by seismic joint inversion input data generation module 80 is described. In particular, beginning at step 120a, seismic joint inversion input data generation module 80 receives update control signal 70 and a-priori/structural information 58, and selects velocity model $V_P(i)$ or $V_P(e)$ based on update control signal 70. For example, for the first iteration, update control signal 70 instructs seismic joint inversion input data generation module 80 to select the initial velocity model $V_P(i)$. For subsequent iterations, update control signal 70 instructs seismic joint inversion input data generation module 80 to select the extracted velocity model $V_P(e)$ from the previous iteration.

Next, at step 122a, a user may use forward calculation parameters selector 96a to select velocity forward calculation parameters 60a2, such as the cell dimension of the velocity model, and other similar parameters that govern the forward calculation process. At step 124, a determination is made whether CIG data will be used. For example, for the first iteration, CIG data are unavailable, and thus the process proceeds to step 128a, described below. However, for subsequent iterations, CIG data are available. For such subsequent iterations, a user may decide whether or not to use CIG data. If CIG data will be used, at step 126 seismic joint inversion input data generation module 80 receives CIG residuals 66, which may include CIG time residuals data at multiple sample points.

At step 127, a determination is made whether FB data will be used. In particular, a user may decide whether or not to use FB data. If FB data will not be used, the process proceeds to step 130a, described below. If, however, FB data will be used, at step 128a, seismic joint inversion input data generation module 80 receives FB data 50a, which may include FB data at multiple sample points.

At step 130a, forward calculation processor 90a calculates forward data using the velocity model ($V_P(i)$ for the initial iteration or $V_P(e)$ for subsequent iterations). Depending on whether CIG data and/or FB data are selected at steps 124 and 127, respectively, forward calculation processor 90a may calculate CIG forward data 60a6 only, FB forward data 104a only, or both CIG forward data 60a6 and FB forward data 104a. If CIG data are selected at step 124, forward calculation processor 90a calculates CIG forward data 60a6 by converting CIG residuals 60a5 from depth residuals to time residuals using common reflection point ("CRP") ray tracing.

If FB data are selected at step 127, forward calculation processor 90a calculates FB forward data 104a at the same sample points as observed FB data 50a. Next, at step 132a, FB residuals data are calculated. For example, residuals calculation processor 92a may subtract observed FB data 50a sample points from corresponding FB forward data 104a sample points to generate FB residuals data 60a1.

Next, at step 134a, constraints and parameters are selected for a "test" velocity inversion. For example, a user may use inversion constraints selector 98a to select velocity inversion constraints 60a3 from a-priori/structural information 58. In addition, a user may use inversion parameters selector 100a to select velocity inversion parameters 60a4. Next, at step 136a, a test velocity inversion is performed. In particular, velocity inversion module 94a receives FB forward data 104a and FB residuals data 60a1 (if FB data are selected at step 127), CIG residuals 60a5 and CIG forward data 60a6 (if CIG data are selected at step 124), velocity forward calculation parameters 60a2, selected velocity inversion constraints 60a3 and selected velocity inversion parameters 60a4, and performs a test inversion to generate a "test" velocity model $V_P(t)$.

Next, at step 138a, the test inversion results are evaluated. In particular, a user may use evaluation module 102a to determine whether the selected velocity inversion constraints 60a3 and selected velocity inversion parameters 60a4 meet predetermined performance objectives. For example, the user may use various numerical analysis techniques to evaluate the performance of the test inversion. If the user determines that the selected velocity inversion constraints 60a3 and selected velocity inversion parameters 60a4 meet predetermined performance objectives, at step 140a the seismic joint inversion input data 60a (i.e., FB residuals data 60a1, velocity forward calculation parameters 60a2, selected velocity inversion constraints 60a3, selected velocity inversion parameters 60a4, CIG residuals 60a5 and CIG forward data 60a6) are output to joint inversion module 14. If, however, the user determines that the selected velocity inversion constraints 60a3 and/or the selected velocity inversion parameters 60a4 do not meet predetermined performance objectives, the process returns to step 134a, and the user may select new velocity inversion constraints 60a3 and/or velocity inversion parameters 60a4.

Figure 6:
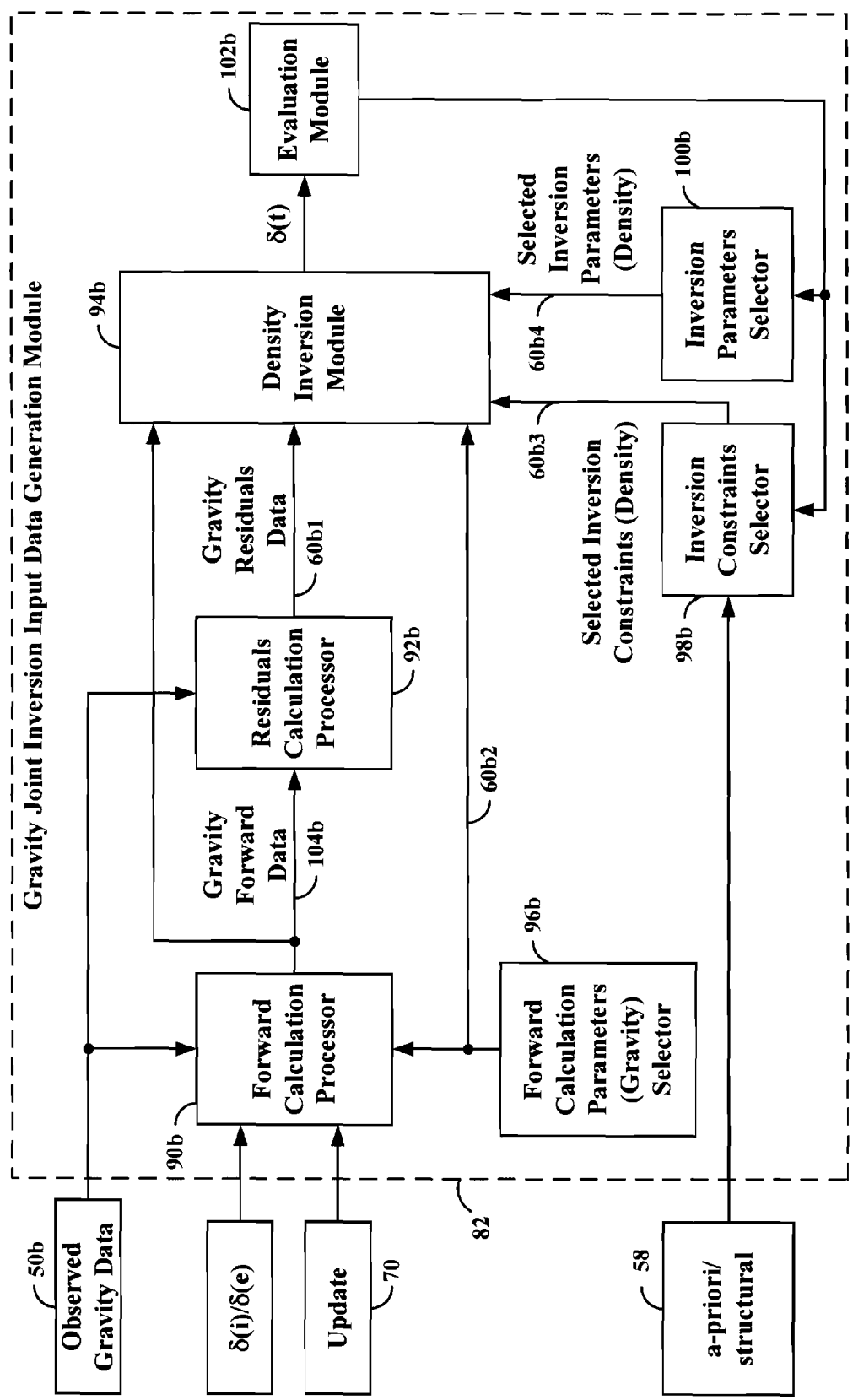
FIG. 6 is a block diagram of an exemplary gravity joint inversion input data generation module in accordance with this invention.

Referring now to FIG. 6, an exemplary gravity joint inversion input data generation module 82 is described. In particular, gravity joint inversion input data generation module 82 includes forward calculation processor 90b, residuals calculation processor 92b, density inversion module 94b, forward calculation parameters selector 96b, inversion constraints selector 98b, inversion parameters selector 100b, and evaluation module 102b. As described in more detail below, gravity joint inversion input data generation module 82 receives observed gravity data 50b, density models δ(i) and/or δ(e), update control signal 70 and a-priori/structural information 58, and generates gravity joint inversion input data 60b. In this exemplary embodiment, gravity joint inversion input data 60b includes gravity residuals data 60b1, gravity forward calculation parameters 60b2, selected gravity inversion constraints 60b3 and selected gravity inversion parameters 60b4.

Figure 7:
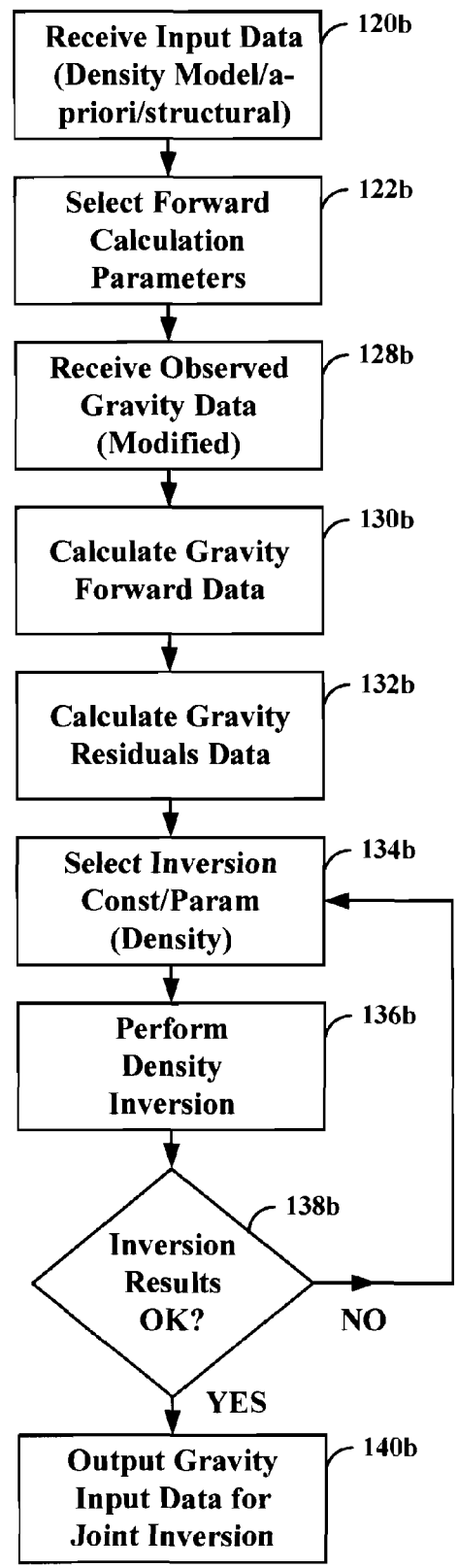
FIG. 7 is a flow diagram of an exemplary process for creating gravity joint inversion input data using the exemplary gravity joint inversion input data generation module of FIG. 6.

Referring now to FIGS. 6 and 7, an exemplary process implemented by gravity joint inversion input data generation module 82 is described. In particular, beginning at step 120b, gravity joint inversion input data generation module 82 receives update control signal 70 and a-priori/structural information 58, and selects density model δ(i) or δ(e) based on update control signal 70. For example, for the first iteration, update control signal 70 instructs gravity joint inversion input data generation module 82 to select the initial density model δ(i). For subsequent iterations, update control signal 70 instructs gravity joint inversion input data generation module 82 to select the extracted density model δ(e) from the previous iteration.

Next, at step 122b, a user may use forward calculation parameters selector 96b to select gravity forward calculation parameters 60b2, such as the cell dimension of the density model, and other similar parameters that govern the forward calculation process. At step 128b, gravity joint inversion input data generation module 82 receives observed gravity data 50b, which includes observed gravity data at multiple sample points. Next, at step 130b, forward calculation processor 90b calculates gravity forward data 104b using the density model δ(i) for the initial iteration or δ(e) for subsequent iterations). In particular, forward calculation processor 90b calculates gravity forward data 104b at the same samples as observed gravity data 50b. Next, at step 132b, gravity residuals data are calculated. For example, residuals calculation processor 92b may subtract observed gravity data 50b sample points from corresponding gravity forward data 104b sample points to generate gravity residuals data 60b1.

Next, at step 134b, constraints and parameters are selected for a "test" density inversion. For example, a user may use inversion constraints selector 98b to select density inversion constraints 60b3 from a-priori/structural information 58. In addition, a user may use inversion parameters selector 100b to select density inversion parameters 60b4. Next, at step 136b, a test density inversion is performed. In particular, density inversion module 94b receives gravity forward data 104b, gravity residuals data 60b1, gravity forward calculation parameters 60b2, selected density inversion constraints 60b3 and selected density inversion parameters 60b4, and performs a test inversion to generate a "test" density model δ(t).

Next, at step 138b, the test inversion results are evaluated. In particular, a user may use evaluation module 102b to determine whether the selected density inversion constraints 60b3 and selected density inversion parameters 60b4 meet predetermined performance objectives. For example, the user may use various numerical analysis techniques to evaluate the performance of the test inversion. If the user determines that the selected density inversion constraints 60b3 and selected density inversion parameters 60b4 meet predetermined performance objectives, at step 140b the joint inversion gravity input data 60b (i.e., gravity residuals data 60b1, gravity forward calculation parameters 60b2, selected gravity inversion constraints 60b3 and selected gravity inversion parameters 60b4) are output to joint inversion module 14. If, however, the user determines that the selected density inversion constraints 60b3 and/or the selected density inversion parameters 60b4 do not meet predetermined performance objectives, the process returns to step 134b, and the user may select new density inversion constraints 60b3 and/or density inversion parameters 60b4.

Figure 8:
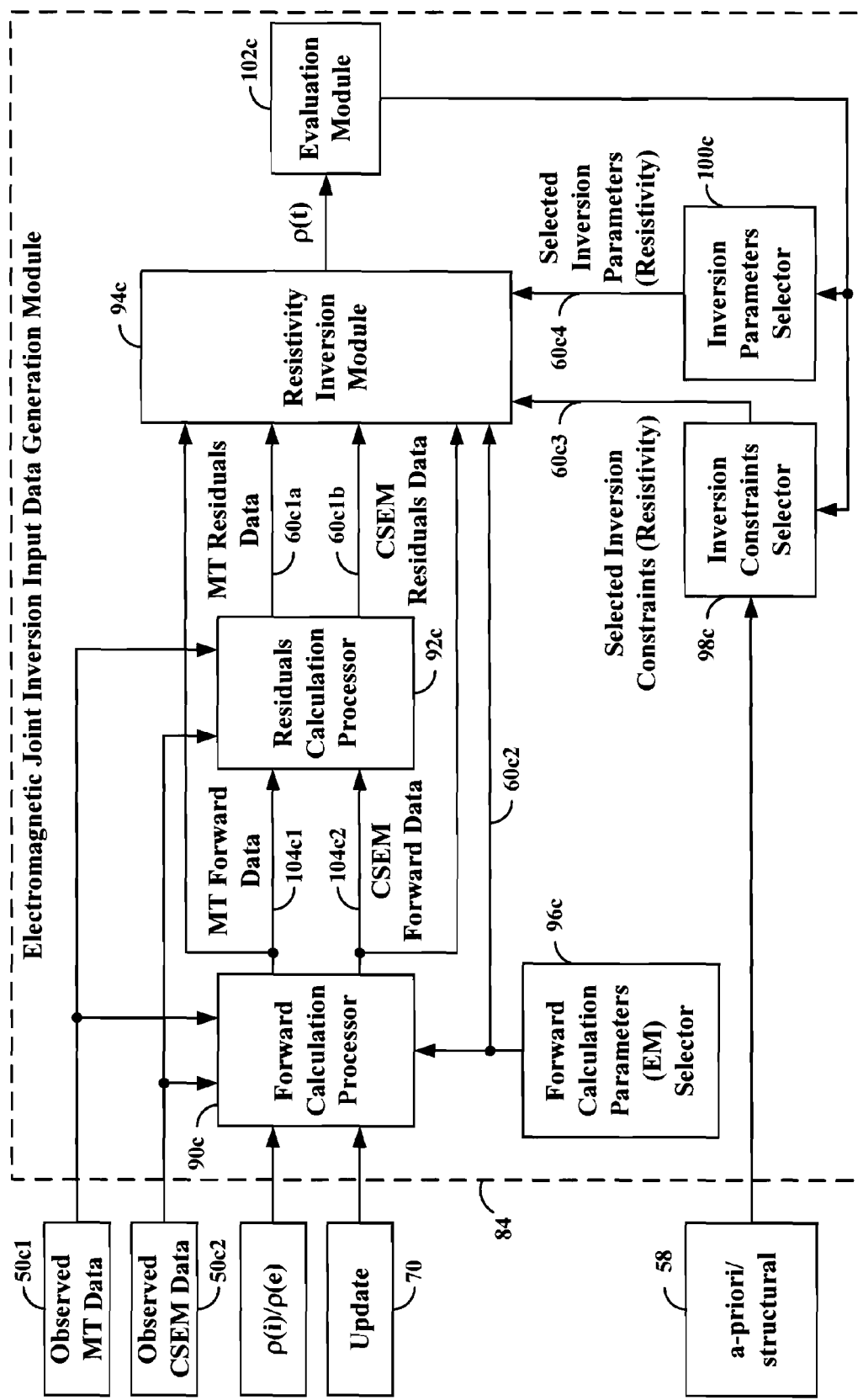
FIG. 8 is a block diagram of an exemplary electromagnetic joint inversion input data generation module in accordance with this invention.

Referring now to FIG. 8, an exemplary EM joint inversion input data generation module 84 is described. In particular, EM joint inversion input data generation module 84 includes forward calculation processor 90c, residuals calculation processor 92c, resistivity inversion module 94c, forward calculation parameters selector 96c, inversion constraints selector 98c, inversion parameters selector 100c, and evaluation module 102c. As described in more detail below, EM joint inversion input data generation module 84 receives observed EM data 50c (e.g., observed MT data 50c1 and/or observed CSEM data 50c2), resistivity models ρ(i) and/or ρ(e), update control signal 70 and a-priori/structural information 58, and generates EM joint inversion input data 60c. In this exemplary embodiment, EM joint inversion input data 60c includes EM residuals data 60c1 (e.g., MT residuals data 60c1a and/or CSEM residuals data 60c1b), EM forward calculation parameters 60c2, selected resistivity inversion constraints 60c3 and selected resistivity inversion parameters 60c4.

Figure 9:
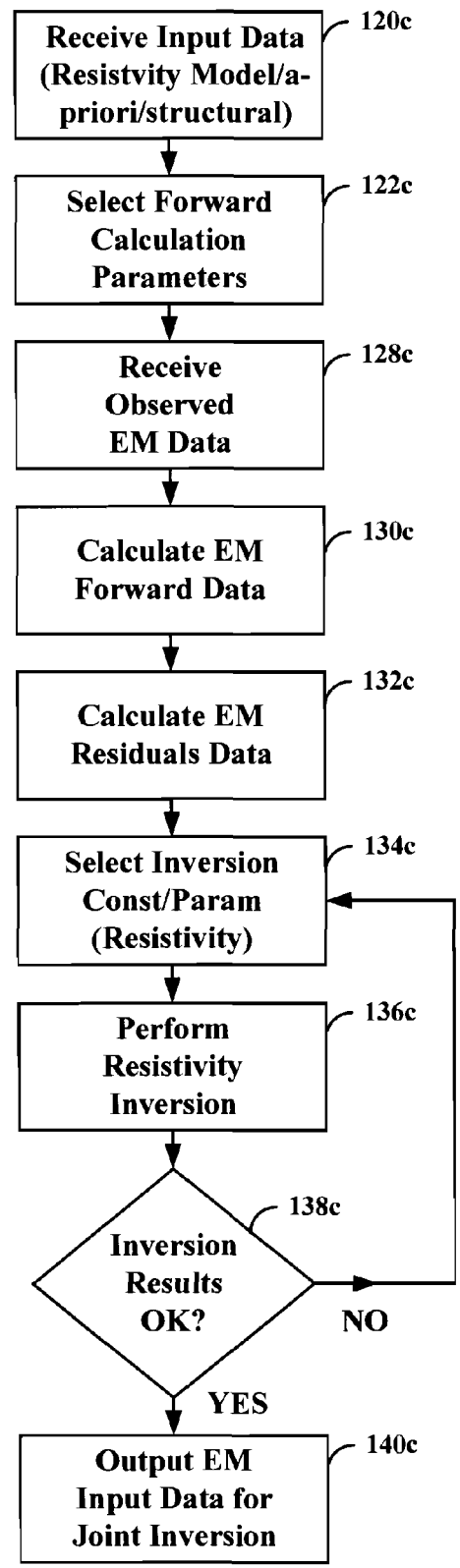
FIG. 9 is a flow diagram of an exemplary process for creating electromagnetic joint inversion input data using the exemplary electromagnetic joint inversion input data generation module of FIG. 8.

Referring now to FIGS. 8 and 9, an exemplary process implemented by EM joint inversion input data generation module 84 is described. In particular, beginning at step 120c, EM joint inversion input data generation module 84 receives update control signal 70 and a-priori/structural information 58, and selects resistivity model ρ(i) or ρ(e) based on the value of update control signal 70. For example, for the first iteration, update control signal 70 instructs EM joint inversion input data generation module 84 to select the initial resistivity model ρ(i). For subsequent iterations, update control signal 70 instructs EM joint inversion input data generation module 84 to select the extracted resistivity model ρ(e) from the previous iteration.

Next, at step 122c, a user may use forward calculation parameters selector 96c to select EM forward calculation parameters 60c2, such as the cell dimension of the resistivity model, and other similar parameters that govern the forward calculation process. At step 128c, EM joint inversion input data generation module 84 receives observed EM data 50c, which may include MT data 50c1 at multiple sample points and/or observed CSEM data 50c2 at multiple sample points. Next, at step 130c, forward calculation processor 90c calculates EM forward data 104c using the selected resistivity model ρ(i) for the initial iteration or ρ(e) for subsequent iterations). In particular, if observed EM data 50c includes observed MT data 50c1, forward calculation processor 90c calculates MT forward data 104c1 at the same samples as observed MT data 50c1. If observed EM data 50c includes observed CSEM data 50c2, forward calculation processor 90c calculates CSEM forward data 104c2 at the same samples as observed CSEM data 50c2.

Next, at step 132c, EM residuals data are calculated. For example, if observed EM data 50c includes observed MT data 50c1, residuals calculation processor 92c may subtract observed MT data 50c1 sample points from corresponding MT forward data 104c1 sample points to generate MT residuals data 60c1a. If observed EM data 50c includes observed CSEM data 50c2, residuals calculation processor 92c may subtract observed CSEM data 50c2 sample points from corresponding CSEM forward data 104c2 sample points to generate CSEM residuals data 60c1b.

Next, at step 134c, constraints and parameters are selected for a "test" resistivity inversion. For example, a user may use inversion constraints selector 98c to select resistivity inversion constraints 60c3 from a-priori/structural information 58. In addition, a user may use inversion parameters selector 100c to select resistivity inversion parameters 60c4. Next, at step 136c, a test resistivity inversion is performed. In particular, resistivity inversion module 94c receives MT forward data 104c1 and/or CSEM forward data 104c2, MT residuals data 60c1a and/or CSEM residuals data 60c1b, EM forward calculation parameters 60c2, selected resistivity inversion constraints 60c3 and selected resistivity inversion parameters 60c4, and performs a test inversion to generate a "test" resistivity model ρ(t).

Next, at step 138c, the test inversion results are evaluated. In particular, a user may use evaluation module 102c to determine whether the selected resistivity inversion constraints 60c3 and selected resistivity inversion parameters 60c4 meet predetermined performance objectives. For example, the user may use various numerical analysis techniques to evaluate the performance of the test inversion. If the user determines that the selected resistivity inversion constraints 60c3 and selected resistivity inversion parameters 60c4 meet predetermined performance objectives, at step 140c the EM joint inversion input data 60c (i.e., EM residuals data 60c1, EM forward calculation parameters 60c2, selected resistivity inversion constraints 60c3 and selected resistivity inversion parameters 60c4) are output to joint inversion module 14. If, however, the user determines that the selected resistivity inversion constraints 60c3 and/or the selected resistivity inversion parameters 60c4 do not meet predetermined performance objectives, the process returns to step 134c, and the user may select new resistivity inversion constraints 60c3 and/or density inversion parameters 60c4.

Figure 10:
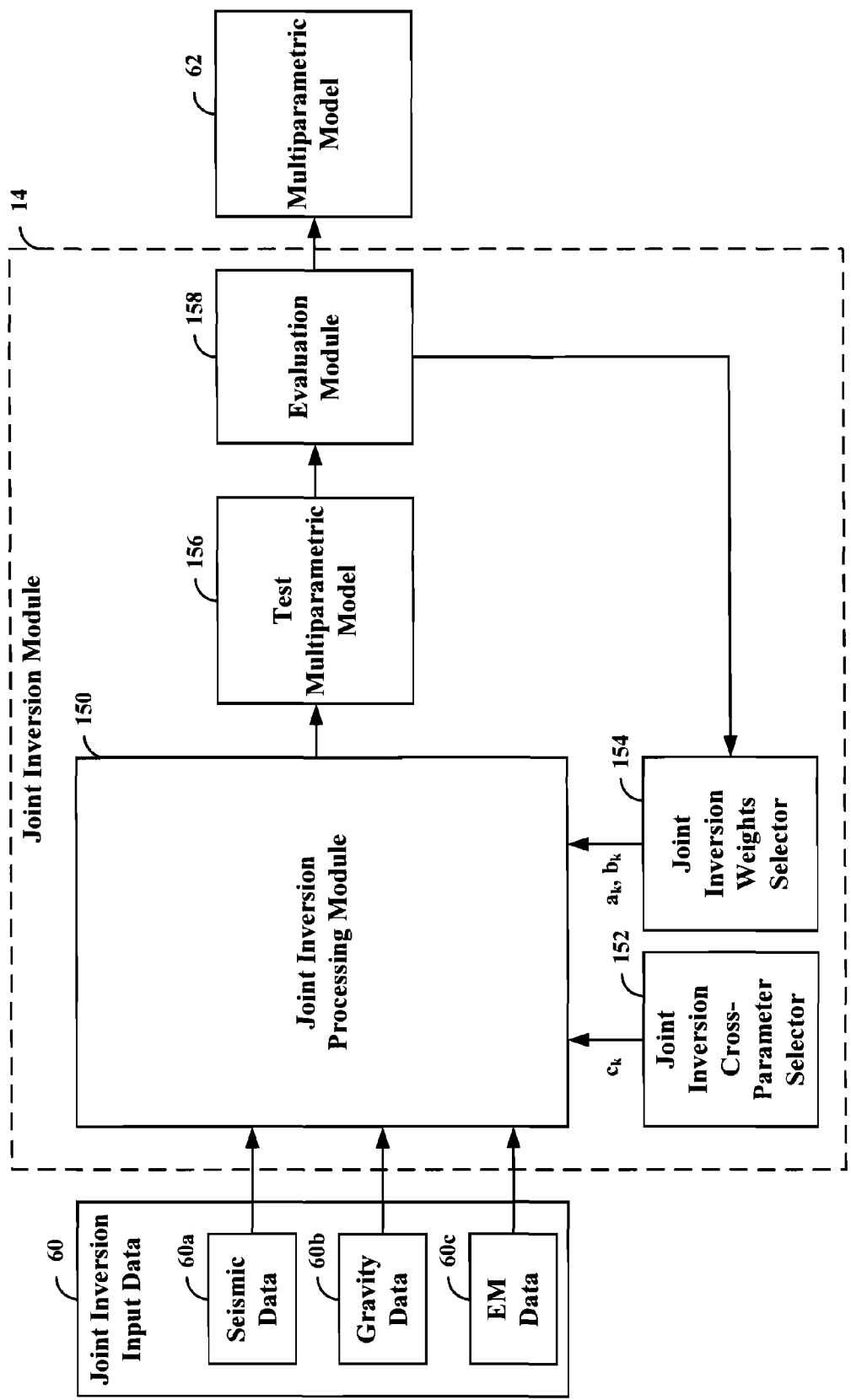
FIG. 10 is an exemplary joint inversion module in accordance with this invention.

Referring again to FIG. 1, joint inversion module 14 receives joint inversion input data 60 and generates multi-parametric model 62. Referring now to FIG. 10, an exemplary joint inversion module 14 is described. In particular, joint inversion module 14 includes joint inversion processing module 150, joint inversion cross-parameter selector module 152, joint inversion weights selector module 154, and evaluation module 158.

Figure 11:
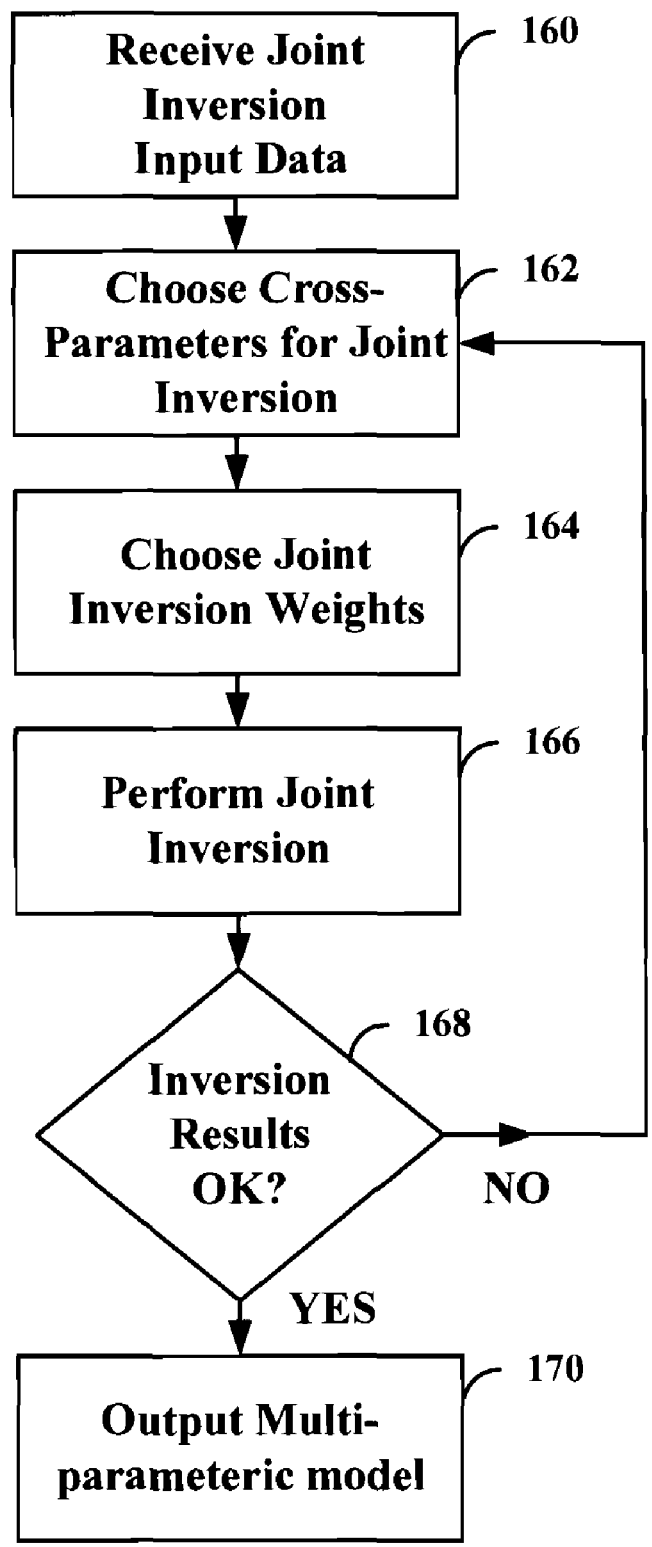
FIG. 11 is an exemplary joint inversion process implemented by the exemplary joint inversion module of FIG. 10.

Referring now to FIGS. 10 and 11, an exemplary joint inversion process implemented by joint inversion module 14 is described. At step 160, joint inversion processing module 150 receives joint inversion input data 60 (i.e., seismic joint inversion input data 60a, gravity joint inversion input data 60b and EM joint inversion input data 60c). Next, at step 162, joint inversion cross-parameter selector module 152 is used to select joint inversion cross-parameter weights $c_k$. For example, a user may use cross-parameter selector module 152 to specify cross-parameter empirical relationships, which indicate links between physical values to be inverted, and cross-parameters structural relationships, which impose pattern similarity on the different inverted models.

Next, at step 164, joint inversion weights selector module 154 is used to specify relative weights that are to be applied to the seismic, gravity and EM methodologies. For example, a user may use joint inversion weights selector module 154 to specify relative joint inversion weights $a_k$, $b_k$. Next, at step 166, a joint inversion is performed. In particular, joint inversion processing module 150 may perform a joint inversion through minimization of an objective function that follows from the application of well-established least squares inverse problem theory. An exemplary objective function is:

$$\phi(m,a,b,c) = \sum_{k=1}^{N} a_k r_k^T C_{D,k}^{-1} r_k + \sum_{k=1}^{N} b_k \|\xi_k(m_k)\|^2 + \sum_{k=1}^{Nl} c_k \|\psi_k(m)\|^2$$

where the first term is the weighted sum of data square errors ($a_k$ are the joint inversion weights chosen by the user, while $C_{D,k}^{-1}$ is the inverse data covariance matrix for the k-th domain), the second term is the weighted sum of different regularization terms, one for each domain ($b_k$ are weights chosen by the user, $\xi_k$ is a generic regularization function) and the third term is the weighted sum of different kind of linking terms between different domains ($c_k$ are user defined weights, $\psi_k$ are linking functions among parameters and $N_1$ is the total number of links used); vectors a, b and c are composed respectively of weights $a_k$, $b_k$ and $c_k$, k=1, 2, ..., N.

In particular, to impose structural similarity among models the following exemplary cross-gradients function generalized to a 3D case may be used:

$$|t(x,y,z)|^2 = |\nabla m_1(x,y,z) \times \nabla m_2(x,y,z)|^2$$

where $m_1$ and $m_2$ are two models (e.g., velocity and density, velocity and resistivity, and resistivity and gravity). Joint inversion is carried out minimizing the objective function with respect to the multiparametric model vector. Persons of ordinary skill in the art will understand that the model parameterization can be different and adaptive (cells of variable dimension in horizontal and vertical directions) for the different methodologies according to the different expected accuracy of the various methodologies used in the joint inversion.

The output of joint inversion processing module 150 is a "test" multiparametric model 156. At step 168, test multiparametric model 156 is evaluated for quality requirements and geological reliability. In particular, a user may use evaluation module 158 to determine whether test multiparametric model 156 meets predetermined performance objectives and is consistent with observed geological data. If the user determines that test multiparametric model 156 meets predetermined performance objectives, at step 170 evaluation module outputs test multiparametric model 156 as multiparametric model 62. If, however, the user determines that test multiparametric model 156 does not meet predetermined performance objectives, the process returns to step 162, and the user may select new joint inversion cross-parameter weights and/or joint inversion weights (at step 164).

Referring again to FIG. 1, model extraction module 16 extracts velocity, density and resistivity models $V_P(e)$, δ(e) and ρ(e), respectively, from multi-parametric model 62. Persons of ordinary skill in the art will understand that any conventional technique may be used to extract velocity, density and resistivity models $V_P(e)$, δ(e) and ρ(e), respectively, from multi-parametric model 62.

As described above, PSDM module 18 uses the extracted velocity model $V_P(e)$ to generate CIG gathers 64. Persons of ordinary skill in the art will understand that any conventional technique may be used to generate CIG gathers 64 from the extracted velocity model $V_P(e)$. For example, a Kirchhoff pre-stack depth migration technique or other similar technique may be used.

Figure 12:
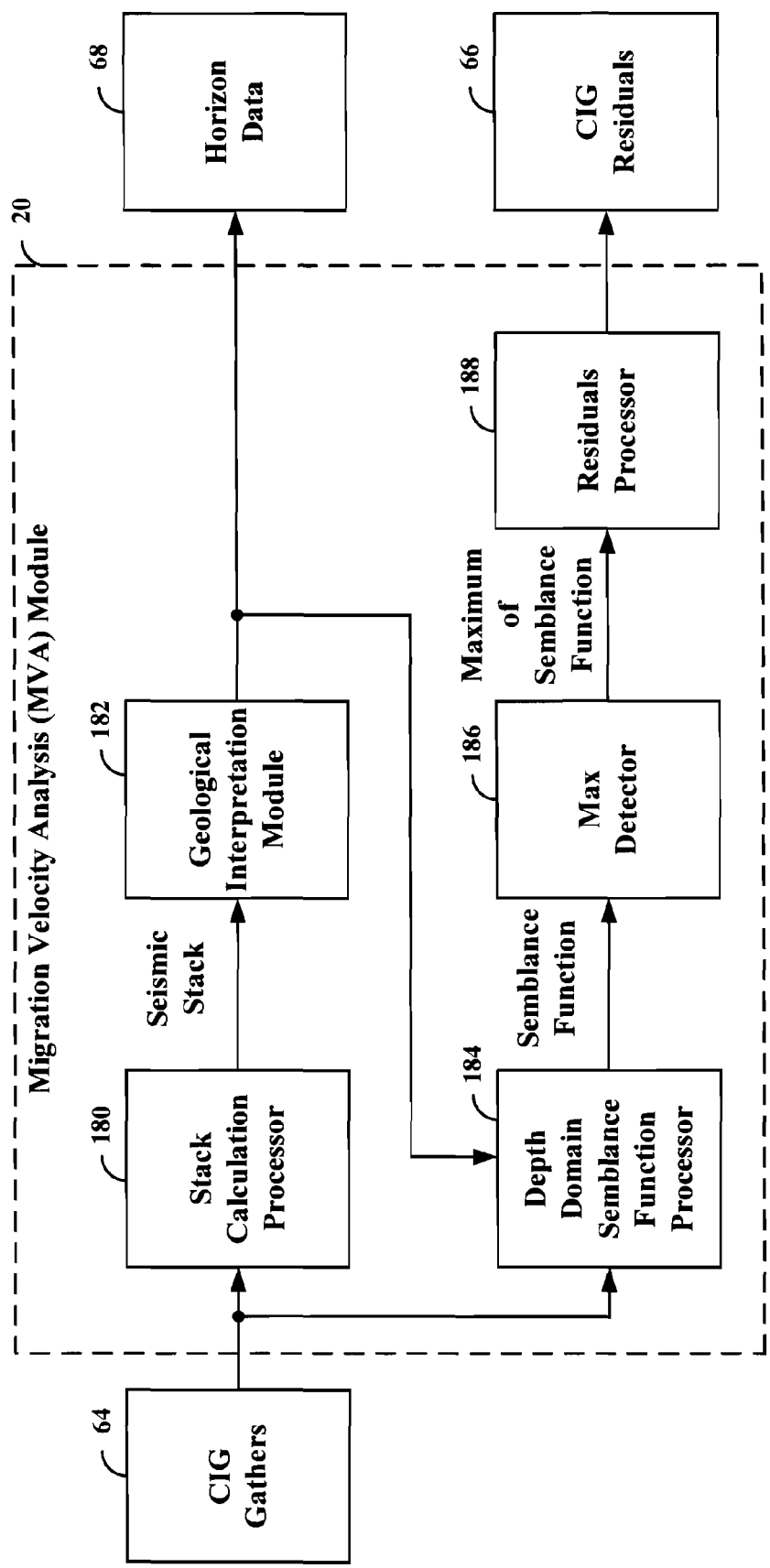
FIG. 12 is an exemplary migration velocity analysis module in accordance with this invention.

In addition, MVA module 20 calculates CIG residuals 66 and horizon data 68 based on CIG gathers 64. Referring now to FIG. 12, an exemplary MVA module 20 is described. In particular, MVA module 20 includes stack calculation processor 180, geological interpretation module 182, depth domain semblance function processor 184, max detector 186 and depth residuals processor 188.

Figure 13:
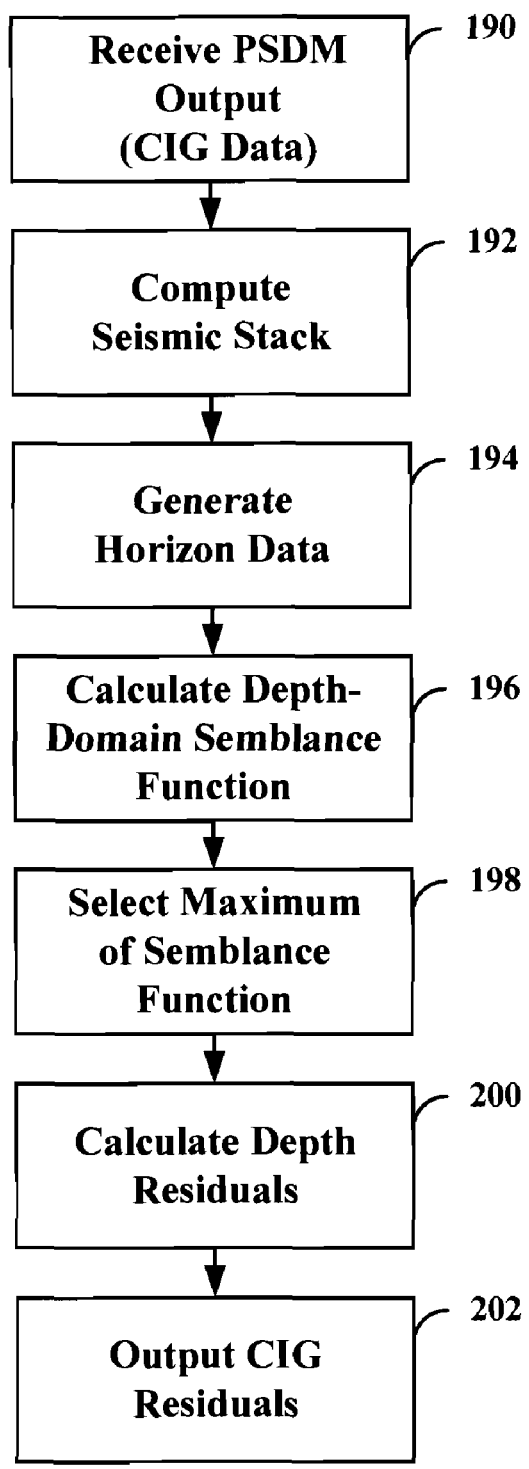
FIG. 13 is an exemplary migration velocity analysis process implemented by the exemplary migration velocity analysis module of FIG. 12.

Referring now to FIGS. 12 and 13, an exemplary operation of MVA module 20 is now described. At step 190, MVA module 20 receives CIG gathers 64 from PSDM module 18. Next, at step 192, stack calculation processor 180 computes a seismic stack from CIG gathers 64. In particular, stack calculation processor 180 sums CIG gathers 64 to generate a seismic image of the underground geology. Next, at step 194, geological interpretation module 182 may be used to generate a set of horizon data 68 from the seismic stack. In particular, a user may use geological interpretation module 182 to select the shapes and geometries of geological units, which generates the set of horizon data 68, which may be expressed as line segments.

At step 196, depth domain semblance function processor generates a depth domain semblance function from CIG gathers 64 and horizon data 68. The depth-domain semblance function is maximum where the maximum residual is present. Thus, at step 198, max detector 186 selects the maximum of the semblance function. Next, at step 200, residuals processor 188 calculates depth residuals from the maximum of the semblance function, converts the depth residuals to time residuals, and outputs the result as CIG residuals 66.

Referring again to FIG. 1, evaluation module 22 receives CIG residuals 66 from MVA modules 20, and then determines if the CIG residuals 66 meet predetermined quality objectives. For example, evaluation module 22 may determine if CIG residuals 66 are less than a predetermined threshold. If so, evaluation module 22 outputs the extracted velocity models $V_P(e)$ as the output velocity model $V_P(o)$. Otherwise, evaluation module 22 sets update control signal 70 to 1 to instruct joint inversion data generation module 12 to generate updated joint inversion input data 60.

Apparatus and methods in accordance with this invention may be implemented as a computer-implemented method, system, and computer program product. In particular, this invention may be implemented within a network environment (e.g., the Internet, a wide area network ("WAN"), a local area network ("LAN"), a virtual private network ("VPN"), etc.), or on a stand-alone computer system. In the case of the former, communication throughout the network can occur via any combination of various types of communications links. For example, the communication links may comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

Figure 14:
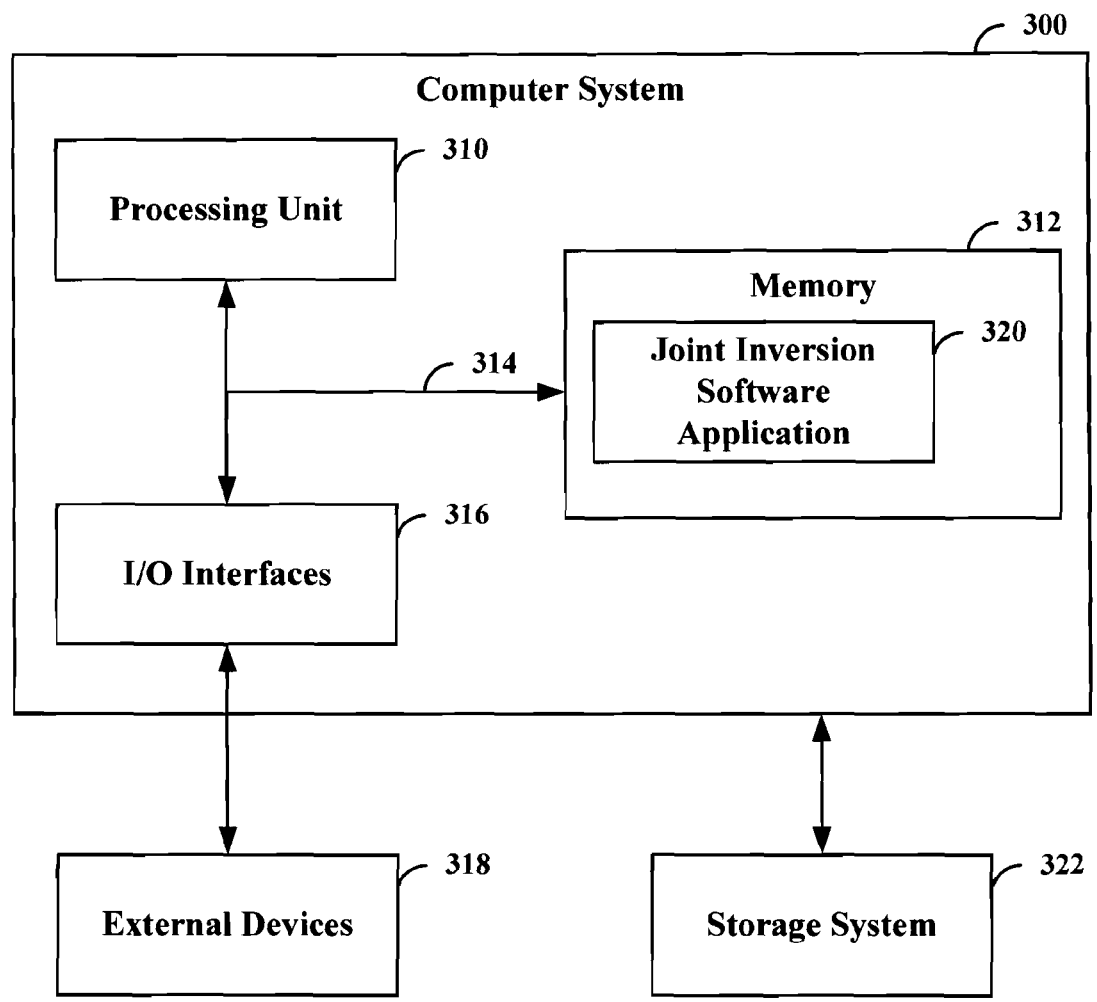
FIG. 14 is an exemplary system for performing joint inversion processes in accordance with this invention.

For example, as shown in FIG. 14, the present invention could be implemented on a computer system, such as computer system 300 that includes a processing unit 310, a memory 312, a bus 314, input/output ("I/O") interfaces 316 and external devices 318. Processing unit 310 may be a computer or processing unit of any type that is capable of performing the functions described herein. Memory 312 is capable of storing a set of machine readable instructions (i.e., computer software) executable by processing unit 310 to perform the desired functions. Memory 312 is any type of media or device for storing information in a digital format on a permanent or temporary basis, such as, e.g., a magnetic media, optical media, flash memory, random access memory, or other similar memory.

In particular, memory 312 includes a joint inversion software application 320, which is a software program that provides the functions of the present invention. Alternatively, joint inversion software application 320 may be stored on storage system 322. Processing unit 310 executes the joint inversion software application 320. While executing computer program code 320, processing unit 310 can read and/or write data to/from memory 312, storage system 322 and/or I/O interfaces 316. Bus 314 provides a communication link between each of the components in computer system 300. External devices 318 can comprise any devices (e.g., keyboard, pointing device, display, etc.) that enable a user to interact with computer system 300 and/or any devices (e.g., network card, modem, etc.) that enable computer system 300 to communicate with one or more other computing devices.

Computer system 300 may include two or more computing devices (e.g., a server cluster) that communicate over a network to perform the various process steps of the invention. Embodiments of computer system 300 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, processing unit 310 can comprise a single processing unit, or can be distributed across one or more processing units in one or more locations, e.g., on a client and server. Similarly, memory 312 and/or storage system 322 can comprise any combination of various types of data storage and/or transmission media that reside at one or more physical locations. Further, I/O interfaces 316 can comprise any system for exchanging information with one or more external devices 318. In addition, one or more additional components (e.g., system software, math co-processing unit, etc.) not shown in FIG. 14 can be included in computer system 300.

Storage system 322 may include one or more storage devices, such as a magnetic disk drive or an optical disk drive. Alternatively, storage system 322 may include data distributed across, for example, a LAN, WAN or a storage area network ("SAN") (not shown). Although not shown in FIG. 14, additional components, such as cache memory, communication systems, system software, etc., may be incorporated into computer system 300.

The foregoing merely illustrates the principles of this invention, and various modifications can be made by persons of ordinary skill in the art without departing from the scope and spirit of this invention. Many variations, modifications, additions and improvements to the embodiments described above are possible.

The invention claimed is:

1. A method for creating a velocity model for pre-stack depth migration, the method comprising:

creating initial joint inversion input data comprising seismic, gravity and electromagnetic data;

jointly inverting, by a computer system, the initial joint inversion input data to create a multiparametric model that comprises velocity, density and resistivity parameter distributions;

extracting, by the computer system, velocity parameters, density parameters and resistivity parameters from the multiparametric model to form an extracted velocity model, an extracted density model, and an extracted resistivity model, respectively;

calculating, by the computer system, a seismic image using the extracted velocity model;

determining, by the computer system, if the calculated seismic image satisfies a predetermined quality criterion; and outputting, by the computer system, the extracted velocity model as the velocity model if the predetermined quality criterion is satisfied.

2. The method of claim 1, wherein creating initial joint inversion input data comprises:

receiving observed seismic, gravity and electromagnetic data;

receiving initial velocity, density and resistivity models; and calculating the initial joint inversion input data based on the observed seismic, gravity and electromagnetic data and the initial velocity, density and resistivity models.

3. The method of claim 2, wherein the observed seismic data comprises first arrival time data.

4. The method of claim 2, wherein the observed gravity data comprises gravity residuals.

5. The method of claim 2, wherein the observed electromagnetic data comprises magnetotelluric data and/or controlled-source electromagnetic data.

6. The method of claim 1, wherein calculating the seismic image comprises performing a pre-stack depth migration using the initial velocity model.

7. The method of claim 1, wherein the seismic image comprises a seismic depth image, and determining comprises determining a residual curvature of the pre-stack seismic depth image to generate seismic depth-domain image residuals.

8. The method of claim 7, wherein determining a residual curvature comprises performing a migration velocity analysis on the seismic depth image.

9. The method of claim 7, further comprising:

converting the seismic depth-domain residuals to seismic time-domain residuals;

comparing the seismic time-domain residuals with a predetermined threshold; and outputting the initial velocity model as the velocity model if the seismic time-domain residuals are less than the predetermined threshold.

10. The method of claim 1, wherein if the predetermined quality criterion is not satisfied, the method further comprises:

creating updated joint inversion input data based on the seismic, gravity and electromagnetic data and the extracted velocity, density and resistivity models;

jointly inverting the updated joint inversion input data to create an updated multiparametric model that comprises velocity, density and resistivity parameter distributions;

extracting velocity parameters, density parameters and resistivity parameters from the updated multiparametric model to form an updated extracted velocity model, an updated extracted density model, and an updated extracted resistivity model, respectively;

calculating an updated seismic image using the updated extracted velocity model;

determining if the calculated updated seismic image satisfies the predetermined quality criterion; and outputting the updated extracted velocity model as the velocity model if the predetermined quality criterion is satisfied.

11. The method of claim 10, further comprising iteratively repeating the creating, jointly inverting, extracting, calculating and determining steps until the calculated updated seismic image satisfies the predetermined quality criterion, until a predetermined number of iterations have been performed, or upon a user instruction to terminate.

12. A system for creating a velocity model for pre-stack depth migration, the system comprising:

means for creating initial joint inversion input data comprising seismic, gravity and electromagnetic data;

means for jointly inverting the initial joint inversion input data to create a multiparametric model that comprises velocity, density and resistivity parameter distributions;

means for extracting velocity parameters, density parameters and resistivity parameters from the multiparametric model to form an extracted velocity model, an extracted density model, and an extracted resistivity model, respectively;

means for calculating a seismic image using the extracted velocity model;

means for determining if the calculated seismic image satisfies a predetermined quality criterion; and means for outputting the extracted velocity model as the velocity model if the predetermined quality criterion is satisfied.

13. The system of claim 12, wherein the means for creating initial joint inversion input data comprises:

means for receiving observed seismic, gravity and electromagnetic data;

means for receiving initial velocity, density and resistivity models; and means for calculating the initial joint inversion input data based on the observed seismic, gravity and electromagnetic data and the initial velocity, density and resistivity models.

14. The system of claim 13, wherein the observed seismic data comprises first arrival time data.

15. The system of claim 13, wherein the observed gravity data comprises gravity residuals.

16. The system of claim 13, wherein the observed electromagnetic data comprises magnetotelluric data and/or controlled-source electromagnetic data.

17. The system of claim 12, wherein the means for calculating the seismic image comprises means for performing a pre-stack depth migration using the initial velocity model.

18. The system of claim 12, wherein the seismic image comprises a seismic depth image, and the means for determining comprises means for determining a residual curvature of the seismic depth image to generate seismic depth-domain residuals.

19. The system of claim 18, wherein the means for determining a residual curvature comprises means for performing a migration velocity analysis on the seismic depth image.

20. The system of claim 18, further comprising:

means for converting the seismic depth-domain residuals to seismic time-domain residuals;

means for comparing the seismic time-domain residuals with a predetermined threshold; and means for outputting the initial velocity model as the velocity model if the seismic time-domain residuals are less than the predetermined threshold.

21. The system of claim 12, wherein the system further comprises:

means for creating updated joint inversion input data based on the observed seismic, gravity and electromagnetic data and the extracted velocity, density and resistivity models;

means for jointly inverting the updated joint inversion input data to create an updated multiparametric model that comprises velocity, density and resistivity parameter distributions;

means for extracting velocity parameters, density parameters and resistivity parameters from the updated multiparametric model to form an updated extracted velocity model, an updated extracted density model, and an updated extracted resistivity model, respectively;

means for calculating an updated seismic image using the updated extracted velocity model;

means for determining if the calculated updated seismic image satisfies the predetermined quality criterion; and means for outputting the updated extracted velocity model as the velocity model if the predetermined quality criterion is satisfied.

22. The system of claim 21, further comprising means for iteratively repeating the creating, jointly inverting, extracting, calculating and determining steps until the calculated updated seismic image satisfies the predetermined quality criterion, until a predetermined number of iterations have been performed, or upon a user instruction to terminate.

23. A system for creating a velocity model for pre-stack depth migration, the system comprising a computer including a processor and a memory device storing a set of machine readable instructions executable by the processor to:

create initial joint inversion input data comprising seismic, gravity and electromagnetic data;

jointly invert the initial joint inversion input data to create a multiparametric model that comprises velocity, density and resistivity parameter distributions;

extract velocity parameters, density parameters and resistivity parameters from the multiparametric model to form an extracted velocity model, an extracted density model, and an extracted resistivity model, respectively;

calculate a seismic image using the extracted velocity model;

determine if the calculated seismic image satisfies a predetermined quality criterion; and output the extracted velocity model as the velocity model if the predetermined quality criterion is satisfied.

24. The system of claim 23, wherein the system creates initial joint inversion input data by:

receiving observed seismic, gravity and electromagnetic data;

receiving initial velocity, density and resistivity models; and calculating the initial joint inversion input data based on the observed seismic, gravity and electromagnetic data and the initial velocity, density and resistivity models.

25. The system of claim 24, wherein the observed seismic data comprises first arrival time data.

26. The system of claim 24, wherein the observed gravity data comprises gravity residuals.

27. The system of claim 24, wherein the observed electromagnetic data comprises magnetotelluric data and/or controlled-source electromagnetic data.

28. The system of claim 23, wherein the system calculates the seismic image by performing a pre-stack depth migration using the initial velocity model.

29. The system of claim 23, wherein the seismic image comprises a seismic depth image, and the system determines a residual curvature of the seismic depth image to generate seismic depth-domain residuals.

30. The system of claim 29, wherein the system determines a residual curvature comprises by performing a migration velocity analysis on the seismic depth image.

31. The system of claim 29, wherein the machine readable instructions are further executable by the processor to:

convert the seismic depth-domain residuals to seismic time-domain residuals;

compare the seismic time-domain residuals with a predetermined threshold; and output the initial velocity model as the velocity model if the seismic time-domain residuals are less than the predetermined threshold.

32. The system of claim 23, wherein if the predetermined quality criterion is not satisfied, the machine readable instructions are executable to further:

calculate updated joint inversion input data based on the observed seismic, gravity and electromagnetic data and the extracted velocity, density and resistivity models;

jointly invert the updated joint inversion input data to create an updated multiparametric model that comprises velocity, density and resistivity parameter distributions;

extract velocity parameters, density parameters and resistivity parameters from the updated multiparametric model to form an updated extracted velocity model, an updated extracted density model, and an updated extracted resistivity model, respectively;

calculate an updated seismic image using the updated extracted velocity model;

determine if the calculated updated seismic image satisfies the predetermined quality criterion; and output the updated extracted velocity model as the velocity model if the predetermined quality criterion is satisfied.

33. The system of claim 32, wherein the machine readable instructions are further executable by the processor to iteratively repeat the creating, jointly inverting, extracting, calculating and determining steps until the calculated updated seismic image satisfies the predetermined quality criterion, until a predetermined number of iterations have been performed, or upon a user instruction to terminate.

34. A computer program product for creating a velocity model for pre-stack depth migration, the computer program product comprising a non-transitory computer readable storage media storing machine readable instructions, wherein the instructions are executable by a computer to:

create initial joint inversion input data comprising seismic, gravity and electromagnetic data;

jointly invert the initial joint inversion input data to create a multiparametric model that comprises velocity, density and resistivity parameter distributions;

extract velocity parameters, density parameters and resistivity parameters from the multiparametric model to form an extracted velocity model, an extracted density model, and an extracted resistivity model, respectively;

calculate a seismic image using the extracted velocity model;

determine if the calculated seismic image satisfies a predetermined quality criterion; and output the extracted velocity model as the velocity model if the predetermined quality criterion is satisfied.

35. The computer program product of claim 34, wherein the machine readable instructions are further executable by the computer to create initial joint inversion input data by:

receiving observed seismic, gravity and electromagnetic data;

receiving initial velocity, density and resistivity models; and calculating the initial joint inversion input data based on the observed seismic, gravity and electromagnetic data and the initial velocity, density and resistivity models.

36. The computer program product of claim 35, wherein the observed seismic data comprises first arrival time data.

37. The computer program product of claim 35, wherein the observed gravity data comprises gravity residuals.

38. The computer program product of claim 35, wherein the observed electromagnetic data comprises magnetotelluric data and/or controlled-source electromagnetic data.

39. The computer program product of claim 34, wherein the machine readable instructions are further executable by the computer to calculate the seismic image by performing a pre-stack depth migration using the initial velocity model.

40. The computer program product of claim 34, wherein the seismic image comprises a seismic depth image, and wherein the machine readable instructions are further executable by the computer to determine a residual curvature of the seismic depth image to generate seismic depth-domain residuals.

41. The system of claim 40, wherein the machine readable instructions are further executable by the computer to determine a residual curvature by performing a migration velocity analysis on the seismic depth image.

42. The system of claim 40, wherein the machine readable instructions are further executable by the processor to:
- convert the seismic depth-domain residuals to seismic time-domain residuals;
- compare the seismic time-domain residuals with a predetermined threshold; and
- output the initial velocity model as the velocity model if the seismic time-domain residuals are less than the predetermined threshold.

43. The system of claim 34, wherein the machine readable instructions are further executable by the computer to:
- calculate updated joint inversion input data based on the observed seismic, gravity and electromagnetic data and the extracted velocity, density and resistivity models;
- jointly invert the updated joint inversion input data to create an updated multiparametric model that comprises velocity, density and resistivity parameter distributions;
- extract velocity parameters, density parameters and resistivity parameters from the updated multiparametric model to form an updated extracted velocity model, an updated extracted density model, and an updated extracted resistivity model, respectively;
- calculate an updated seismic image using the updated extracted velocity model;
- determine if the calculated updated seismic image satisfies the predetermined quality criterion; and
- output the updated extracted velocity model as the velocity model if the predetermined quality criterion is satisfied.

44. The computer program product of claim 43, wherein the machine readable instructions are further executable by the processor to iteratively repeat the creating, jointly inverting, extracting, calculating and determining steps until the calculated updated seismic image satisfies the predetermined quality criterion, until a predetermined number of iterations have been performed, or upon a user instruction to terminate.

* * * * *